US012763895B2

(12) United States Patent
Takamiya

(10) Patent No.: US 12,763,895 B2
(45) Date of Patent: Oct. 13, 2026

(54) RADIO COMMUNICATION SYSTEM AND RELAY STATION

(71) Applicant: JVCKENWOOD Corporation, Yokohama (JP)

(72) Inventor: Kazuki Takamiya, Yokohama (JP)

(73) Assignee: JVCKENWOOD CORPORATION, Yokohama (JP)

( * ) Notice: Subject to any disclaimer, the term of this patent is extended or adjusted under 35 U.S.C. 154(b) by 287 days.

(21) Appl. No.: 18/409,955

(22) Filed: Jan. 11, 2024

(65) Prior Publication Data

US 2024/0243865 A1 Jul. 18, 2024

(30) Foreign Application Priority Data

Jan. 17, 2023 (JP) ................................ 2023-005414

(51) Int. Cl.

| | |
|---|---|
| ***H04L 5/00*** | (2006.01) |
| ***G10L 25/78*** | (2013.01) |
| ***H04W 4/10*** | (2009.01) |
| ***H04W 64/00*** | (2009.01) |
| *H04L 5/16* | (2006.01) |

(52) U.S. Cl.

CPC ............ *H04L 5/0048* (2013.01); *G10L 25/78* (2013.01); *H04W 64/003* (2013.01); *H04L 5/16* (2013.01); *H04W 4/10* (2013.01)

(58) Field of Classification Search

CPC ....... H04L 5/0048; G10L 25/78; G10L 25/51; H04W 64/003

See application file for complete search history.

(56) References Cited

U.S. PATENT DOCUMENTS

| | | | | |
|---|---|---|---|---|
| 10,555,136 | B1 * | 2/2020 | Bar-on | H04L 65/1069 |
| 2018/0092058 | A1 | 3/2018 | Kumashiro | |
| 2020/0329348 | A1 * | 10/2020 | Halun | H04W 12/06 |
| 2021/0076169 | A1 * | 3/2021 | Arachchi | H04W 4/021 |

FOREIGN PATENT DOCUMENTS

| | | |
|---|---|---|
| JP | 2018-056621 A | 4/2018 |

* cited by examiner

*Primary Examiner* — Faruk Hamza
*Assistant Examiner* — Aixa A Guadalupe Cruz
(74) *Attorney, Agent, or Firm* — PROCOPIO, CORY, HARGREAVES & SAVITCH LLP

(57) ABSTRACT

A radio communication system including a first terminal, a second terminal, a contact destination terminal, and a relay station, in which the first terminal transmits, when a specific sound has been detected, a first transmission request including information regarding the first sound and information regarding the contact destination terminal to the relay station, the second terminal transmits, when a specific sound has been detected, a second transmission request including information regarding the second sound and information regarding the contact destination terminal to the relay station, and the relay station creates, when the first sound and the second sound are sounds that have occurred due to one event, a communication group including the first terminal, the second terminal, and the contact destination terminal is provided.

5 Claims, 6 Drawing Sheets

601

| COMMUNICATION GROUP ID | INFORMATION REGARDING SOUND | CHANNEL INFORMATION | DATE AND TIME OF CREATION | IDENTIFICATION INFORMATION OF RADIO COMMUNICATION TERMINAL 20 OF CONTACT SOURCE | POSITIONAL INFORMATION | IDENTIFICATION INFORMATION OF RADIO COMMUNICATION TERMINAL 20 OF CONTACT DESTINATION |
|---|---|---|---|---|---|---|
| COMMUNICATION GROUP A | INFORMATION REGARDING SOUND A | CHANNEL INFORMATION A | DATE AND TIME OF CREATION A | RADIO COMMUNICATION TERMINAL A | POSITIONAL INFORMATION A | RADIO COMMUNICATION TERMINAL D |
| | | | | RADIO COMMUNICATION TERMINAL B | POSITIONAL INFORMATION B | RADIO COMMUNICATION TERMINAL D |
| | | | | RADIO COMMUNICATION TERMINAL C | POSITIONAL INFORMATION C | RADIO COMMUNICATION TERMINAL E |
| COMMUNICATION GROUP B | . . . | . . . | . . . | . . . | . . . | . . . |
| . . . | . . . | . . . | . . . | . . . | . . . | . . . |

Fig. 6

RADIO COMMUNICATION SYSTEM AND RELAY STATION

CROSS REFERENCE TO RELATED APPLICATION

This application is based upon and claims the benefit of priority from Japanese patent application No. 2023-005414, filed on Jan. 17, 2023, the disclosure of which is incorporated herein in its entirety by reference.

BACKGROUND

The present disclosure relates to a radio communication system and a relay station.

Japanese Unexamined Patent Application Publication No. 2018-056621 discloses a technique for creating a temporary group in consideration of positions of members (users) who hold radio devices.

However, according to related art, for example, it is possible that an appropriate communication group may not be created in accordance with an event that has occurred near a user.

SUMMARY

In a first aspect according to this embodiment, a radio communication system including a first terminal, a second terminal, a contact destination terminal, and a relay station, in which the first terminal includes: a first terminal detection unit configured to detect a specific sound; and a first terminal transmission unit configured to transmit, when a first sound has been detected, a first transmission request including information regarding the first sound and information regarding the contact destination terminal to the relay station, the second terminal includes: a second terminal detection unit configured to detect a specific sound: and a second terminal transmission unit configured to transmit, when a second sound has been detected, a second transmission request including information regarding the second sound and information regarding the contact destination terminal to the relay station, and the relay station includes: a reception unit configured to receive the first transmission request and the second transmission request: a determination unit configured to determine whether or not the first sound and the second sound have occurred due to one event: and a creation unit configured to create, when the determination unit has determined that the first sound and the second sound have occurred due to one event, a communication group including the first terminal, the second terminal, and the contact destination terminal is provided.

Further, in a second aspect according to this embodiment, a relay station including: a reception unit configured to receive, from a first terminal that has detected a first sound, a first transmission request including information regarding the first sound and information regarding a contact destination terminal and receive, from a second terminal that has detected a second sound, a second transmission request including information regarding the second sound and information regarding the contact destination terminal: a determination unit configured to determine whether or not the first sound and the second sound have occurred due to one event: and a creation unit configured to create, when the determination unit has determined that the first sound and the second sound are sounds that have occurred due to one event, a communication group including the first terminal, the second terminal, and the contact destination terminal is provided.

According to this embodiment, it is possible to create an appropriate communication group in accordance with an event that has occurred near a user.

BRIEF DESCRIPTION OF THE DRAWINGS

The above and other aspects, advantages and features will be more apparent from the following description of certain embodiments taken in conjunction with the accompanying drawings, in which:

FIG. 6 is a diagram showing one example of a communication group database (DB) according to the embodiment.

DETAILED DESCRIPTION

Principles of this embodiment are described with reference to several illustrative embodiments. It should be understood that these embodiments are set forth for purposes of illustration only and that those skilled in the art will assist in understanding and practicing this embodiment without suggesting limitations on the scope of this embodiment. The disclosure described herein may be implemented in various methods other than those described below.

In the following description and claims, unless otherwise defined, all technical and scientific terms used herein have the same meaning as commonly understood by one of those skilled in the art of technology to which this embodiment belongs.

Hereinafter, one embodiment of this embodiment will be described with reference to the drawings.

<System Configuration>

Figure 1:
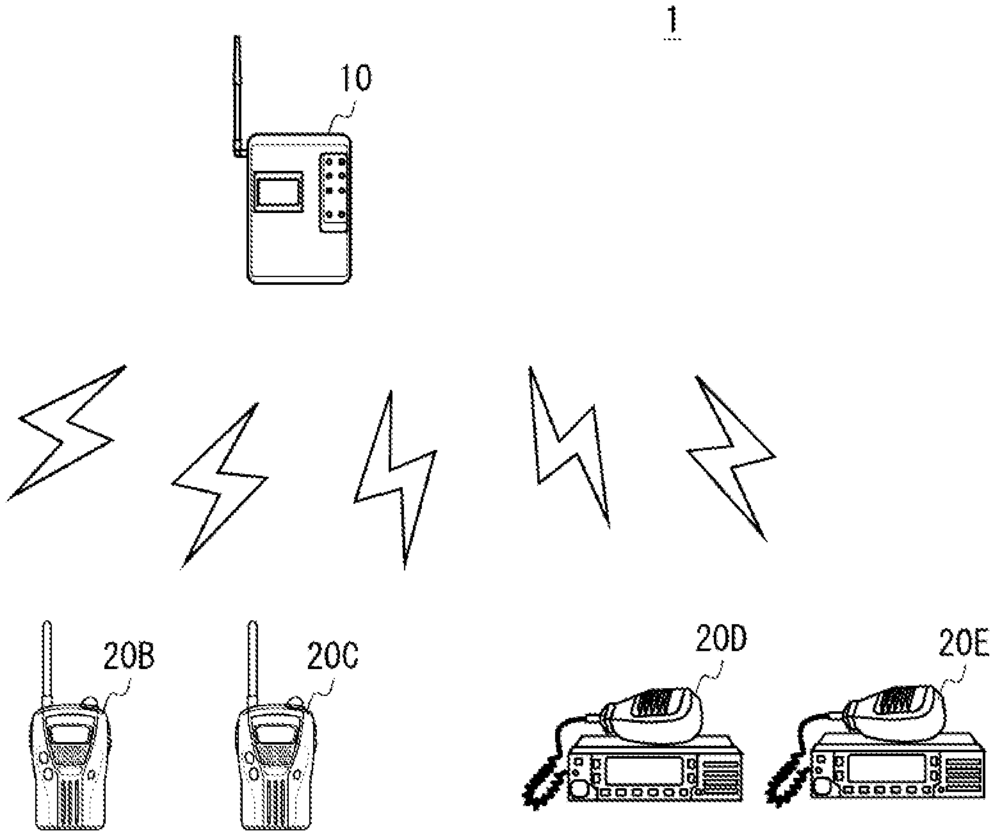
FIG. 1 is a diagram showing one example of a configuration of a radio communication system according to an embodiment.

Referring to FIG. 1, a configuration of a radio communication system 1 according to an embodiment will be described. FIG. 1 is a diagram showing a configuration example of the radio communication system 1 according to the embodiment. In the example shown in FIG. 1, the radio communication system 1 includes a relay station (repeater) 10. Further, the radio communication system 1 includes a radio communication terminal 20A, a radio communication terminal 20B, a radio communication terminal 20C, a radio communication terminal 20D, and a radio communication terminal 20E (hereinafter, when it is unnecessary to distinguish one radio communication terminal from another, they are simply referred to as "radio communication terminals 20"). Note that the number of relay stations 10 and the number of radio communication terminals 20 are not limited to those in the example shown in FIG. 1.

The relay station 10 relays radio waves received from one radio communication terminal 20 to the other radio communication terminals 20. The relay station 10 may convert radio waves received on one channel (a call sending channel) into another channel (a call receiving channel) and then relay the radio waves after being converted.

Each of the radio communication terminals 20 may be, for example, a terminal (a push-to-talk terminal, a specified low-power transceiver) that performs half-duplex communication by a dedicated radio (a business radio) for conveying business information, such as a police radio, a fire radio, a disaster prevention radio, a railway radio, a ship radio, a defense-force radio, and the like. Note that a half-duplex communication where communication is alternately performed using a channel for transmission and a channel for reception via the relay station 10 is also referred to as semi-duplex.

Each of the radio communication terminals 20 may be used, for example, for police work, fires, emergencies, administrative purposes, disaster relief, mountain rescue, coast guard work, taxi operator work, truck operator work, and the like. Each of the radio communication terminals 20 may intermittently receive (scan or listen) a predetermined channel, receive a voice signal transmitted from another radio communication terminal 20 on this channel, and output the voice signal from a speaker.

Further, each of the radio communication terminals 20 may modulate a signal representing a sound such as a voice of a user collected by a microphone and transmit the modulated signal on this channel. When a channel of a group including a plurality of calling partners is used, a sound, such as a voice of the user, which has been collected by the microphone, is simultaneously transmitted (broadcast) to the plurality of calling partners.

Further, the radio communication terminals 20A-20C may include a function (a Voice Operation Transmission (VOX) function or a hands-free function) for transmitting a voice in a case where a sound whose volume is equal to or larger than a predetermined volume is detected even when a Push-to-Talk (PTT) button is not pressed.

The radio communication terminal 20 may be, for example, a portable radio communication terminal carried by a user, like the radio communication terminals 20A-20C shown in FIG. 1. In this case, the radio communication terminal 20 may include a microphone and a speaker in positions where the radio communication terminal 20 can be held by the user's hand and calls can be made, like mobile telephones. Further, the radio communication terminal 20 may be fixed to a belt or the like of the user by a clip or the like, or may be held by a shoulder strap holder (case) or the like and hung over the user's shoulder. In this case, the radio communication terminal 20 may include a speaker microphone and the like so that the user can make calls without holding the radio communication terminal 20 in his/her hand.

Further, the radio communication terminal 20 may be, for example, an on-board (in-vehicle) radio communication terminal mounted on a mobile body such as a vehicle, a ship, and the like, like the radio communication terminals 20D and 20E shown in FIG. 1. In this case, the radio communication terminal 20 may include a microphone which allows a user to hold it by his/her hand when he/she sends a speech. Further, the radio communication terminal 20 may include a headset or a standing microphone for allowing the user to make hands-free calls.

In a radio communication terminal 20 of a contact source, identification information on a radio communication terminal 20 of a contact destination to which a specific sound is automatically transmitted via the relay station 10 when this sound occurs is set (registered) in advance by a user or the like. The specific sound may be, for example, a sound whose volume is equal to or larger than a specific volume.

Further, the specific sound may be, for example, a specific type of sound (e.g., gunshot or explosion) determined based on waveforms or the like of the sound. The identification information of the radio communication terminal 20 may be, for example, a number for identifying the radio communication terminal 20 of the contact destination or identification information of the channel intermittently received by the radio communication terminal 20 of the contact destination.

<Hardware Configuration>

Figure 2:
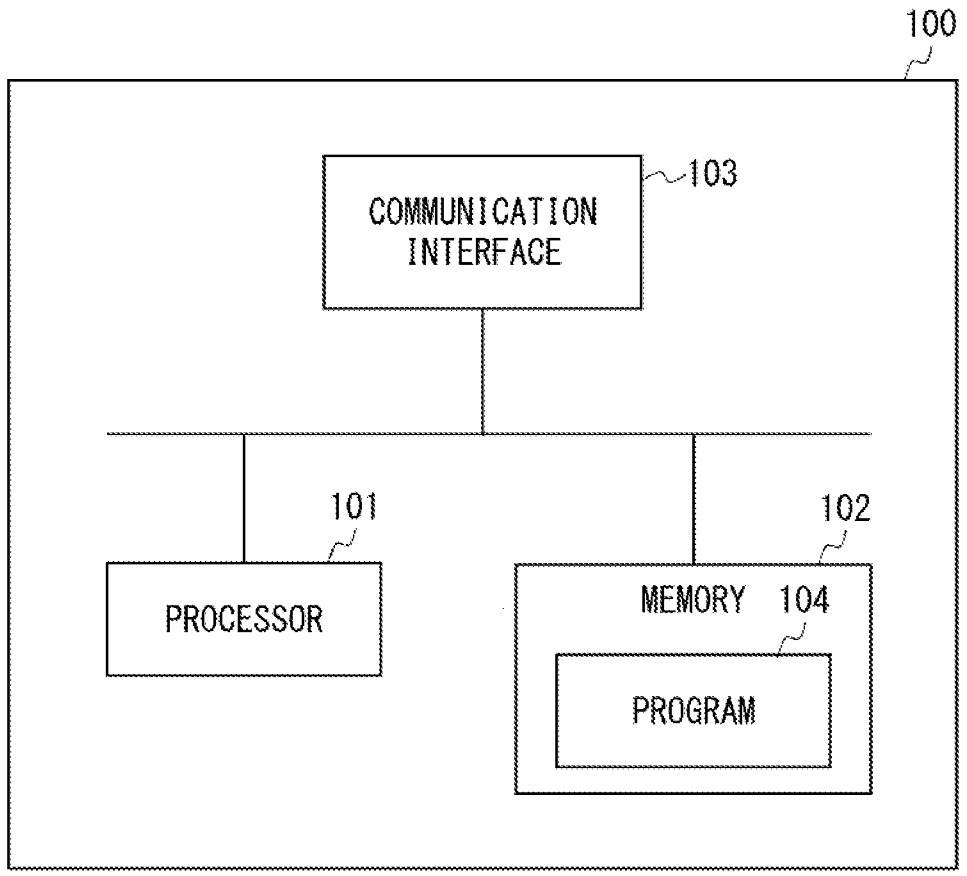
FIG. 2 is a diagram showing an example of a hardware configuration of a computer of a relay station, and a radio communication terminal according to the embodiment.

FIG. 2 is a diagram showing an example of a hardware configuration of a computer 100 of the relay station 10 and the radio communication terminal 20 according to the embodiment. In the example shown in FIG. 2, the computer 100 includes a processor 101, a memory 102, and a communication interface 103. These components may be connected to each other by a bus or the like. The memory 102 stores at least a part of a program 104. The communication interface 103 includes an interface necessary for communication with other network elements.

As the program 104 is executed by cooperation of the processor 101, the memory 102, and the like, at least one of the processes in the embodiment is performed by the computer 100. The memory 102 may be any type of memory suitable for a network using a local technology. The memory 102 may be, by way of a non-limiting example, a non-transitory computer readable storage medium. Further, the memory 102 may be implemented by using an arbitrary suitable data storage technology, such as a semiconductor-based memory device, a magnetic memory device and system, an optical memory device and system, a fixed memory, and a removable memory. Although only one memory 102 is shown in the computer 100, several physically different memory modules may be included in the computer 100. The processor 101 may be any type of computer. The processor 101 may include at least one of a general purpose computer, a dedicated computer, a microprocessor, a digital signal processor (DSP: Digital Signal Processor), and, as a non-limiting example, a processor based on a multi-core processor architecture. The computer 100 may include a plurality of processors, such as an application specific integrated circuit chip that is temporally dependent on a clock by which the main processor is synchronized.

This embodiment may be implemented by hardware or a dedicated circuit(s), software, logic, or any combination thereof. In some aspects, this embodiment may be implemented by hardware, and in others aspect, this embodiment may be implemented by firmware or software that can be executed by a controller, a microprocessor, or other computing devices.

This embodiment also provides at least one computer program product tangibly stored in a non-transitory computer readable storage medium. The computer program product includes computer executable instructions, such as instructions included in program modules, is executed by a device on a real or virtual processor of interest, and thereby performs a process or method according to this embodiment. The program modules include routines, programs, libraries, objects, classes, components, data structures, and the like by which specific tasks are performed and/or specific abstract data types are implemented. The functions of the program modules may be combined or divided among the program modules as desired in various embodiments. The machine executable instructions of the program modules can be executed locally or in distributed devices. In the distributed devices, the program modules can be disposed on both local and remote storage media.

A program code(s) for implementing a method according to this embodiment may be written in any combination of at least one programming languages. Such program codes are provided to a processor or controller of a general purpose computer, a dedicated computer, or other programmable data processing devices. As the program code is executed by the processor or controller, the functions/operations in the flowchart and/or the block diagram to be implemented are performed. The program code is executed entirely on a machine, partially on a machine, as a standalone software package, partially on a machine, partially on a remote machine, or entirely on a remote machine or server. The program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

<Configuration>

Figure 3:
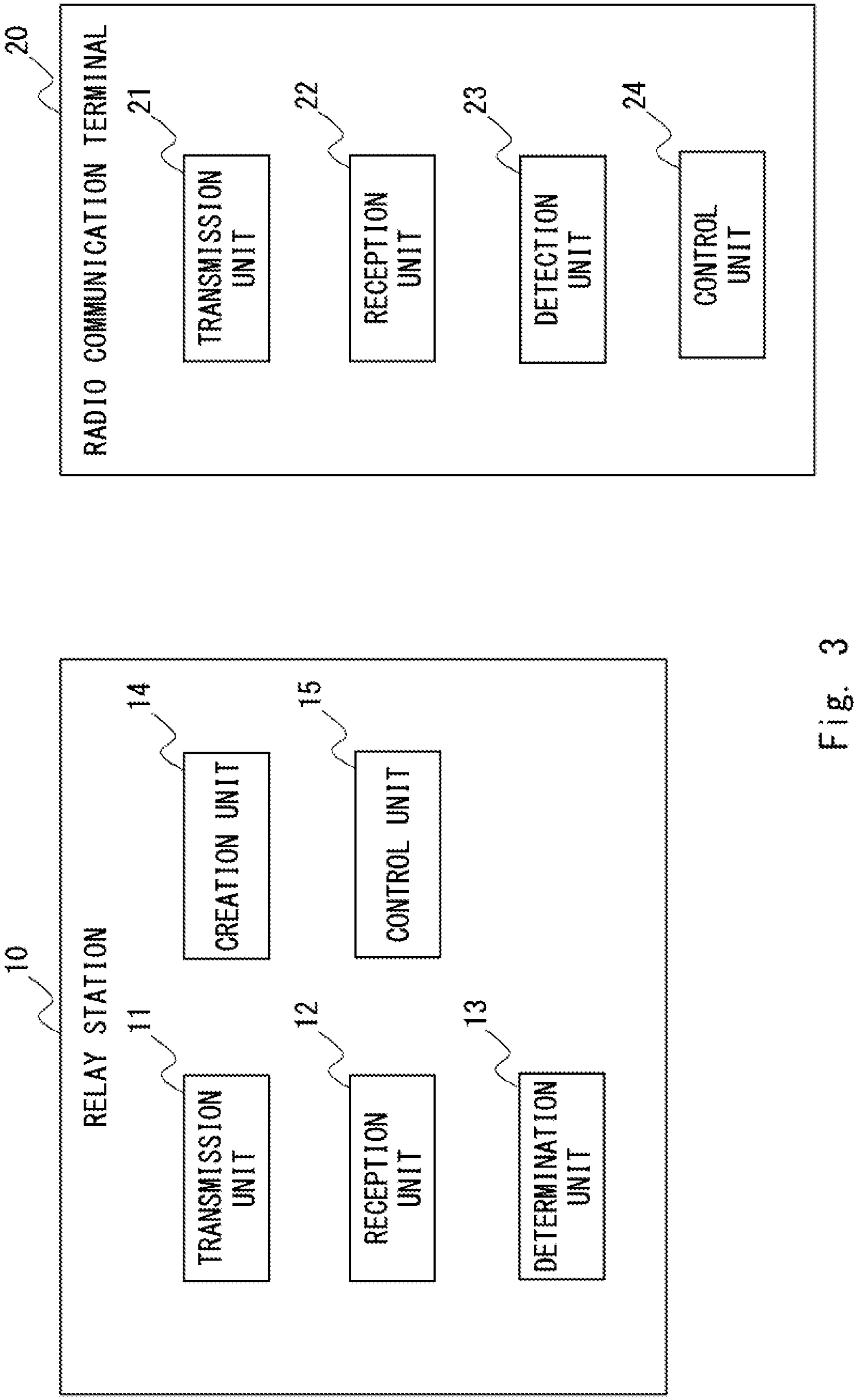
FIG. 3 is a diagram showing one example of a configuration of a relay station and a radio communication terminal according to the embodiment.

Referring now to FIG. 3, a configuration of the relay station 10 and the radio communication terminal 20 according to the embodiment will be described. FIG. 3 is a diagram showing one example of the configuration of the relay station 10 and the radio communication terminal 20 according to the embodiment.

<<Configuration of Relay Station 10>>

In the example shown in FIG. 3, the relay station 10 includes a transmission unit 11, a reception unit 12, a determination unit 13, a creation unit 14, and a control unit 15. Each of these units may be implemented by cooperation of one or more programs installed in the relay station 10 and hardware such as the processor 101 and the memory 102 of the relay station 10.

The transmission unit 11 transmits data to the radio communication terminal 20 by half-duplex communication. Further, the transmission unit 11 transmits an assignment notification including channel information used for communication in a communication group created by the creation unit 14 to each of the radio communication terminals 20 included in the communication group. The reception unit 12 receives data from the radio communication terminal 20 by half-duplex communication. The determination unit 13 determines whether or not sounds received from a plurality of respective radio communication terminals 20 of the contact sources are sounds that have occurred due to one event. When the determination unit 13 has determined that the sounds received from the plurality of respective radio communication terminals 20 of the contact sources are sounds that have occurred due to one event, the creation unit 14 creates a communication group including a plurality of radio communication terminals 20 of the contact sources and the radio communication terminals 20 of the contact destinations which the plurality of radio communication terminals 20 of the contact sources contact.

The control unit 15 causes the transmission unit 11 to transmit a voice from one of the radio communication terminals 20 of the contact sources included in the communication group that has transmitted a transmission request received by the relay station 10 first to the other radio communication terminals 20 included in the communication group in a period after a specific amount of time passes since the creation of the communication group by the creation unit 14.

<<Configuration of Radio Communication Terminal 20>>

In the example shown in FIG. 3, the radio communication terminal 20 includes a transmission unit 21, a reception unit 22, a detection unit 23, and a control unit 24. Each of these units may be implemented by cooperation of one or more programs installed in the radio communication terminal 20 and hardware such as a processor and a memory of the radio communication terminal 20.

The transmission unit 21 transmits a user's speech to other radio communication terminals 20 via the relay station 10 by half-duplex communication. The reception unit 22 receives voices from the other radio communication terminals 20 via the relay station 10 by half-duplex communication. The detection unit 23 detects a specific sound. The control unit 24 controls each of the units of the radio communication terminal 20.

<Processes>

Figure 4:
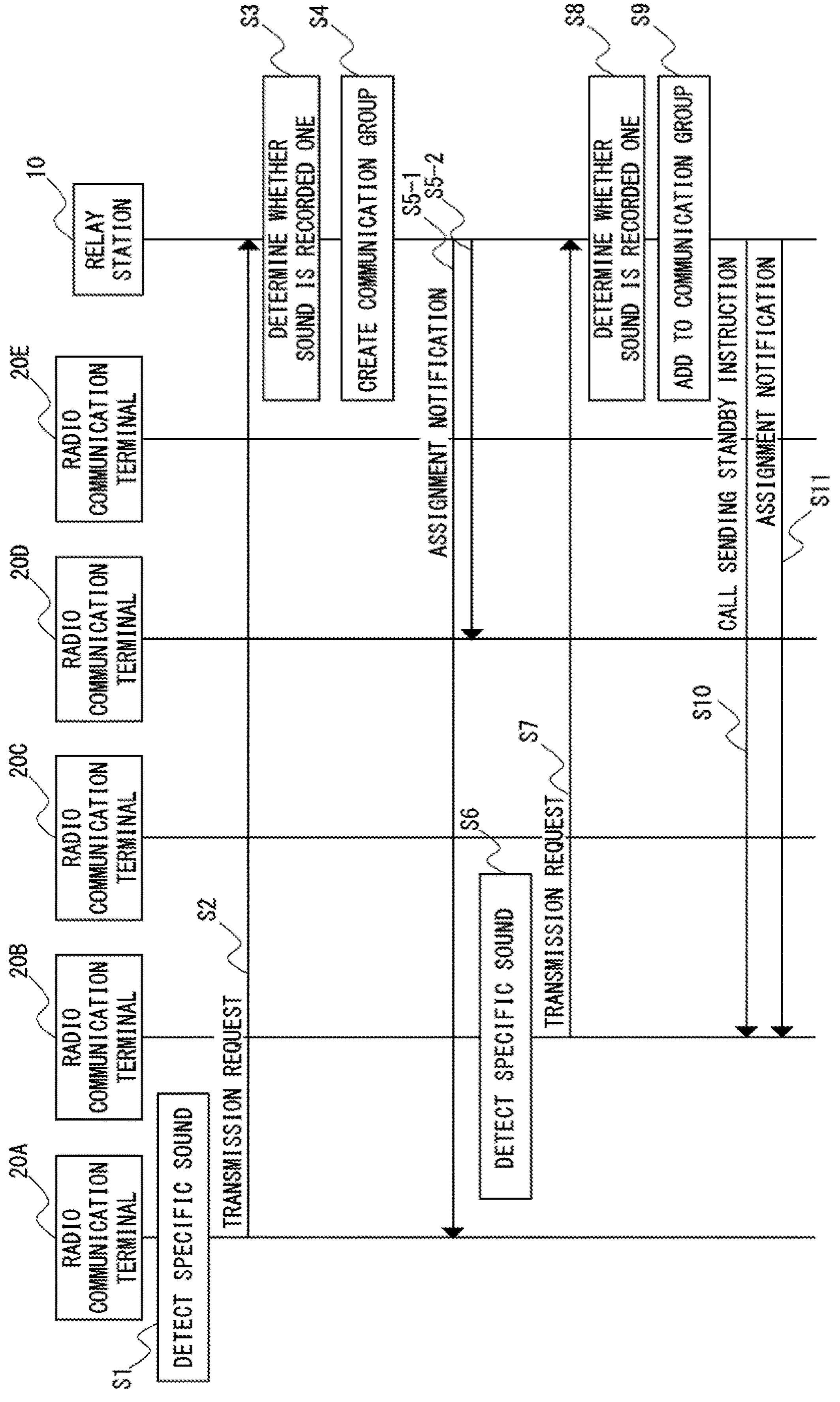
FIG. 4 is a sequence diagram showing one example of processing in a radio communication system according to the embodiment.
Figure 5:
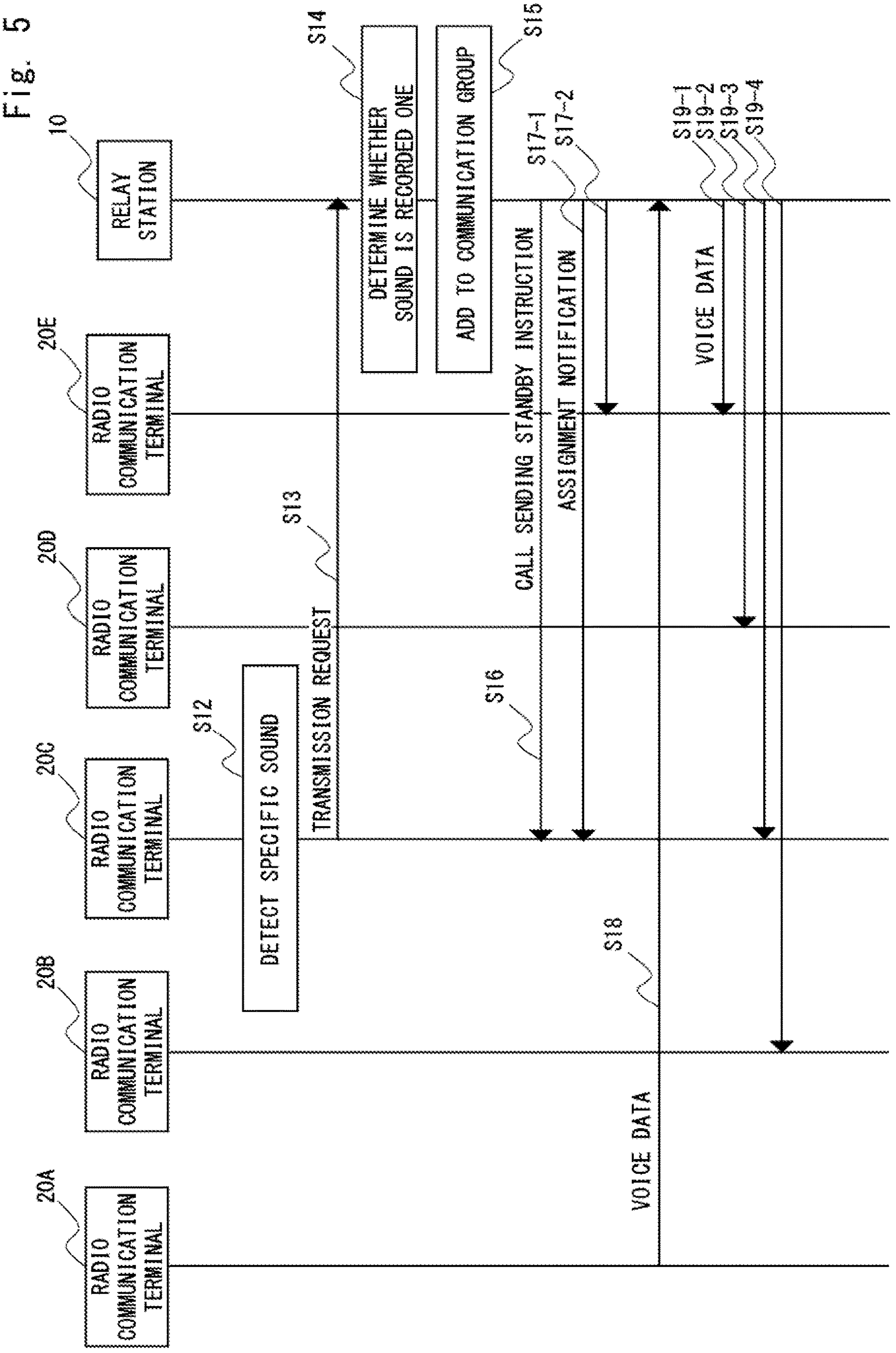
FIG. 5 is a sequence diagram showing one example of processing in the radio communication system according to the embodiment.

Referring next to FIGS. 4 to 6, one example of processes of the radio communication system 1 according to the embodiment will be described. FIGS. 4 and 5 are sequence diagrams showing one example of processes of the radio communication system 1 according to the embodiment. The processes shown in FIG. 4 follow the processes shown in FIG. 5. FIG. 6 is a diagram showing one example of a communication group database (DB) 601 according to the embodiment.

In the following description, it is assumed that a radio communication terminal 20D is set in each of the radio communication terminal 20A and the radio communication terminal 20B as the radio communication terminal 20 of the contact destination when a specific sound is detected. It is further assumed that a radio communication terminal 20E is set in the radio communication terminal 20C as the radio communication terminal 20 of the contact destination when a specific sound is detected. It is also assumed that, since the radio communication terminals 20A-20C are located near a place where an event such as an incident or an accident has occurred, sounds that have occurred due to one event are collected by microphones.

Note that the orders of the following processes may be changed as appropriate. For example, the processes in Steps S1 and S2 in the radio communication terminal 20A, the processes in Steps S6 and S7 in the radio communication terminal 20B, and the processes in Steps S12 and S13 in the radio communication terminal 20C may be executed in parallel (asynchronously). Further, at least some of the following processes may be omitted.

In Step S1, the detection unit 23 of the radio communication terminal 20A detects a specific sound. Here, the detection unit 23 of the radio communication terminal 20A may detect, for example, a sound whose volume is equal to or larger than a specific volume as the specific sound. Further, the detection unit 23 of the radio communication terminal 20A may determine, for example, whether or not the sound collected by a microphone is a specific type of sound (e.g., gunshot or explosion) based on waveforms or the like of the sound, and determine that a specific sound has been detected when the collected sound is a specific type of sound.

Next, the transmission unit 21 of the radio communication terminal 20A transmits, to the relay station 10, a transmission request for requesting start of voice transmission from the radio communication terminal 20A to the radio communication terminal 20D (Step S2). Here, the transmission request may include information on the specific sound that has been detected, identification information of the radio communication terminal 20A, identification information of the radio communication terminal 20D (one example of "information regarding the contact destination terminal") and the positional information of the radio communication terminal 20A. The information on the specific sound that has been detected may include at least one of information indicating at least a part of the waveform of the specific sound detected by the radio communication terminal 20A or information indicating the type of this specific sound. The positional information of the radio communication terminal 20A may be measured based on, for example, a satellite positioning system such as a Global Positioning System (GPS).

Next, the determination unit 13 of the relay station 10 determines whether or not a sound that has occurred due to an event the same as that which has caused the sound detected by the radio communication terminal 20B is recorded in the communication group DB 601 (Step S3). In this case, the determination unit 13 of the relay station 10 may determine whether or not events that have caused sounds detected by the respective radio communication terminals 20 are the same based on at least one of the type of the sound detected by the radio communication terminal 20A, the positional information of the radio communication terminal 20A, or the date and time when the sound is detected by the radio communication terminal 20A. In this case, when the type of the sound detected by the radio communication terminal 20A is the same as the type of the sound recorded in the communication group DB 601, the determination unit 13 of the relay station 10 may determine that these sounds are sounds that have occurred due to one event.

Further, if the positional information of the radio communication terminal 20A and the positional information on the radio communication terminal 20 when the sound recorded in the communication group DB 601 is detected satisfy specific conditions, the determination unit 13 of the relay station 10 may determine that these sounds have occurred due to one event. In this case, the determination unit 13 of the relay station 10 may determine that these sounds have occurred due to one event when, for example, the difference between the positional information when a sound is detected by the radio communication terminal 20A and the positional information on the radio communication terminal 20 when the sound recorded in the communication group DB 601 is detected is equal to or smaller than a threshold. Further, if the difference between the date and time when the sound is detected by the radio communication terminal 20A and the date and time when the sound recorded in the communication group DB 601 is detected is equal to or smaller than a threshold, the determination unit 13 of the relay station 10 may determine that these sounds have occurred due to one event.

Further, if the type of the sound detected by the radio communication terminal 20A is the same as the type of the sound recorded in the communication group DB 601 and the difference between the date and time when the sound is detected by the radio communication terminal 20A and the date and time when the sound recorded in the communication group DB 601 is detected is equal to or smaller than a threshold, the determination unit 13 of the relay station 10 may determine that these sounds have occurred due to one event.

Further, if the difference between the positional information when a sound is detected by the radio communication terminal 20A and the positional information on the radio communication terminal 20 when the sound recorded in the communication group DB 601 is detected is equal to or smaller than the threshold and the difference between the date and time when the sound is detected by the radio communication terminal 20A and the date and time when the sound recorded in the communication group DB 601 is detected is equal to or smaller than the threshold, the determination unit 13 of the relay station 10 may determine that these sounds have occurred due to one event.

Next, when the sound that has occurred due to an event the same as the event which has caused the sound detected by the radio communication terminal 20A is not recorded in the communication group DB 601, the creation unit 14 of the relay station 10 creates (generates) a temporary communication group and records information on this communication group in the communication group DB 601 (Step S4). Here, the creation unit 14 of the relay station 10 may determine (allocate or assign), for example, identification information of the communication group, a channel used for the communication in the communication group, and the like.

In the example shown in FIG. 6, information regarding the sound, channel information, and the date and time of creation are recorded in the communication group DB 601 in such a way that they are associated with a communication group ID. Further, positional information, and identification information of the radio communication terminal 20 of the contact destination are recorded in such a way that they are associated with a combination of the communication group ID and the identification information of the radio communication terminal 20 of the contact source.

The communication group ID is identification information of the communication group that has been temporarily created. The information regarding the sound may include, for example, at least one of information indicating at least a part of the waveform of a specific sound detected by the radio communication terminal 20 of the contact source, or information indicating the type of this specific sound.

The channel information is information indicating a channel used in communication in a communication group. When the call sending channel and the call receiving channel are different from each other, the channel information may include, for example, information on the call sending channel and information on the call receiving channel. Note that the channel used for the communication in the communication group may be allocated by the relay station 10. The date and time of creation is the date and time when the communication group is created. The date and time of creation may be, for example, the date and time when the radio communication terminal 20A has detected a specific sound, the date and time being notified from the radio communication terminal 20A. Alternatively, the date and time of creation may be, for example, the date and time when the relay station 10 has received the transmission request from the radio communication terminal 20A. The positional information is also positional information of the radio communication terminal 20 of the contact source when this radio communication terminal 20 has detected a specific sound.

Next, the transmission unit 11 of the relay station 10 transmits an assignment notification including information indicating a channel used for communication in the communication group to each of the radio communication terminal 20A and the radio communication terminal 20D (Steps S5-1 and S5-2). Note that the assignment notification may include a communication group ID and channel information. Further, the assignment notification may include information based on the sound detected by the radio communication terminal 20A. In this case, the information based on the sound detected by the radio communication terminal 20A may include, for example, information indicating the type of the sound. Accordingly, for example, the user of the radio communication terminal 20 of the contact source is able to know that a communication group has been created based on a specific sound.

Next, the detection unit 23 of the radio communication terminal 20B detects a specific sound (Step S6). Next, the transmission unit 21 of the radio communication terminal 20B transmits, to the relay station 10, a transmission request for requesting start of voice transmission from the radio communication terminal 20B to the radio communication terminal 20D (Step S7). Note that the processes in Steps S5 and S6 may be similar to the processes in Steps S1 and S2. Therefore, in the description of the processes of Steps S5 and S6, for example, the radio communication terminal 20A in the description of the processes of Steps S1 and S2 may be replaced by a radio communication terminal 20B.

Next, the creation unit 14 of the relay station 10 determines whether or not a sound that has occurred due to an event the same as that which has caused the sound detected by the radio communication terminal 20B is recorded in the communication group DB 601 (Step S8). The process in Step S8 may be similar to the process in Step S3. When the sound that has occurred due to an event the same as that which has caused the sound detected by the radio communication terminal 20B is not recorded in the communication group DB 601, another communication group is generated according to a process similar to that in Step S3. On the other hand, when the sound that has occurred due to an event the same as that which has caused the sound detected by the radio communication terminal 20B is recorded in the communication group DB 601, the process moves to the following process.

Next, the control unit 15 of the relay station 10 adds the radio communication terminal 20B to the communication group and records information indicating this addition in the communication group DB 601 (Step S9). Here, the control unit 15 of the relay station 10 may add, for example, the radio communication terminal 20B and the radio communication terminal 20 which the radio communication terminal 20B contacts to the communication group associated with this sound. Since the radio communication terminal 20D which the radio communication terminal 20B contacts has already been included in the communication group, only the radio communication terminal 20B is added.

Next, the transmission unit 11 of the relay station 10 transmits, to the radio communication terminal 20B, a notification (a call sending standby instruction) indicating that call sending is prohibited until a specific amount of time (e.g., five seconds) passes after, for example, the date and time when the communication group is created (Step S10). The radio communication terminal 20B that has received this notification notifies the user of this information using a display or the like and prohibits voice transmission until a specific amount of time passes.

Note that the transmission unit 11 of the relay station 10 prohibits specific radio communication terminals 20 of the contact sources included in the communication group, from sending calls for a specific amount of time. The specific radio communication terminals 20 is other than the radio communication terminal 20A which has transmitted a transmission request that the relay station 10 has received first. Accordingly, even when, for example, users of the radio communication terminals 20 of the contact sources have made utterances at substantially the same time in the event of a gunshot or the like, it is possible to reduce collisions of call sending in the half-duplex communication. Therefore, it is possible to reduce, for example, a situation where a user is confused by a displayed error message indicating that calls cannot be sent to radio communication terminals 20 other than one radio communication terminal 20 because communication 2 are busy.

Next, the transmission unit 11 of the relay station 10 transmits an assignment notification including channel information used for the communication in the communication group to the radio communication terminal 20B (Step S11).

Next, the detection unit 23 of the radio communication terminal 20C detects a specific sound (Step S12). Next, the transmission unit 21 of the radio communication terminal 20C transmits, to the relay station 10, a transmission request for requesting start of voice transmission from the radio communication terminal 20C to the radio communication terminal 20E (Step S13). Note that the processes in Steps S8 and S9 may be similar to the processes in Steps S1 and S2. Therefore, in the description of the processes in Steps S8 and S9, for example, the radio communication terminal 20A in the description of the processes in Steps S1 and S2 may be replaced by the radio communication terminal 20C and the radio communication terminal 20D may be replaced by the radio communication terminal 20E.

Next, the determination unit 13 of the relay station 10 determines whether or not the sound that has occurred due to an event the same as the event which has caused the sound detected by the radio communication terminal 20C is recorded in the communication group DB 601 (Step S14). The process in Step S14 may be similar to the process in Step S3. When it is not determined that the sound that has occurred due to an event the same as the event which has caused the sound detected by the radio communication terminal 20C is recorded in the communication group DB 601, another communication group is generated according to a process similar to that in Step S3. On the other hand, when it is determined that the sound that has occurred due to an event the same as the event which has caused the sound detected by the radio communication terminal 20C is recorded in the communication group DB 601, the process moves to the following process.

Next, the creation unit 14 of the relay station 10 adds the radio communication terminal 20C and the radio communication terminal 20E to the communication group and records information indicating this addition in the communication group DB 601 (Step S15).

Next, the transmission unit 11 of the relay station 10 transmits a call sending standby instruction to the radio communication terminal 20C (Step S16). Next, the transmission unit 11 of the relay station 10 transmits an assignment notification including channel information used for the communication in the communication group to the radio communication terminal 20C and the radio communication terminal 20E (Steps S17-1 and S17-2).

Next, the transmission unit 21 of the radio communication terminal 20A transmits voice data obtained by coding a sound collected by the microphone of the radio communication terminal 20A to the relay station 10 (Step S18). Here, the radio communication terminal 20A may transmit the voice data by half-duplex radio communication on the channel instructed by the assignment notification from the relay station 10. Here, the radio communication terminal 20A may code a voice (sound) such as a gunshot detected and recorded in Step S1 and transmit the coded voice (sound).

Next, the transmission unit 11 of the relay station 10 broadcasts the voice data received from the radio communication terminal 20A to the radio communication terminals 20 (radio communication terminals 20B-20E) included in the communication group other than the radio communication terminal 20A (Steps S19-1 to S19-4). Here, the transmission unit 11 of the relay station 10 may forward, for example, voice data received by the call sending channel in the communication group on a call receiving channel in the communication group. Further, the radio communication terminals 20B-20E may receive the voice data by half-duplex radio communication on the channel instructed by the assignment notification from the relay station 10. The radio communication terminals 20B-20E may then output the voice received from the radio communication terminal 20A from a speaker.

When the time specified by the call sending standby instruction has passed, the radio communication terminals 20B and 20C, which are radio communication terminals 20 of the contact sources other than the radio communication terminal 20A, may be able to transmit a speech by a VOX function or the like. Accordingly, for example, after a gunshot or a first speech of the user of the radio communication terminal 20A, which has been detected by the radio communication terminal 20A, a speech of each user can be received by other users.

When a specific amount of time (e.g., one minute) has passed since the last transmission of voice data by each of the radio communication terminals 20 included in the communication group, the creation unit 14 of the relay station 10 may erase this communication group. In this case, the creation unit 14 of the relay station 10 may transmit a channel release request to each of the radio communication terminals 20. Accordingly, each of the radio communication terminals 20 may stop listening to the channel or the like for receiving calls in the communication group. Further, the creation unit 14 of the relay station 10 may erase data (record) of the communication group recorded in the communication group DB 601.

Others

A case in which a plurality of radio communication terminals 20 of the contact sources register one radio communication terminal 20 as a contact destination and the plurality of radio communication terminals 20 of the contact sources detect one sound such as a gunshot will be considered. In this case, according to related art, when the radio communication terminal 20 of the contact destination can listen to only one channel, only the communication with the radio communication terminal 20 of the contact source that has performed sending first is connected, and the sending from the radio communication terminal 20 of the contact source that has performed sending later is not connected (not rejected) since the communication is busy.

Further, when the radio communication terminal 20 of the contact destination is able to listen to a plurality of channels, the communication between the radio communication terminal 20 of the contact source that has performed sending first and the radio communication terminal 20 of the contact destination, and the communication between the radio communication terminal 20 of the contact source that has performed sending later and the radio communication terminal 20 of the contact destination are connected separately from each other. It is therefore considered that a situation where it is difficult for users to smoothly have a conversation with each other may occur.

On the other hand, according to the aforementioned embodiment, it is possible, for example, to create an appropriate communication group in accordance with an event that has occurred near a user. It is therefore possible, for example, to allow a conversation in which a plurality of radio communication terminals 20 of the contact sources that have detected one sound such as a gunshot and each of the radio communication terminals 20 of the contact destinations registered by each of the radio communication terminals 20 of the contact sources as a contact destination are included in one group.

Modified Examples

While the relay station 10 may be an apparatus included in one housing, the relay station 10 according to this embodiment is not limited to this example. Each unit of the relay station 10 may be implemented, for example, by cloud computing constituted by one or more computers. Such a relay station is also included in one example of the "relay station" according to this embodiment.

While the invention has been described in terms of several embodiments, those skilled in the art will recognize that the invention can be practiced with various modifications within the spirit and scope of the appended claims and the invention is not limited to the examples described above.

Further, the scope of the claims is not limited by the embodiments described above.

Furthermore, it is noted that, Applicant's intent is to encompass equivalents of all claim elements, even if amended later during prosecution.

What is claimed is:

1. A radio communication system comprising a first terminal, a second terminal, a contact destination terminal, and a relay station, wherein the first terminal comprises:

a first detection configuration comprising hardware or a combination of hardware and software configured to detect a specific sound; and a first transmission configuration comprising transmission hardware or a combination of hardware and software configured to transmit, in response to detection of a first sound, provided in the first terminal;

(i) first sound information which is sound type information of the first sound, (ii) identification information of the contact destination terminal associated with the first terminal, (iii) position information of the first terminal, and (iv) detection time information of the first sound to the relay station as a first transmission request message, the second terminal comprises:

a second detection configuration comprising hardware or a combination of hardware and software configured to detect a specific sound; and a second transmission configuration comprising transmission hardware or a combination of hardware and software configured to transmit, in response to detection of a second sound, provided in the second terminal;

(i) second sound information which is sound type information of the second sound, (ii) identification information of the contact destination terminal associated with the second terminal, (iii) position information of the second terminal, and (iv) detection time information of the second sound to the relay station as a second transmission request message, the relay station comprises:

a reception configuration configured to receive the first and second transmission request messages; and a determination configuration configured to determine whether or not the first and second sounds are caused by a same event based on at least one of conditions including:

(a) sound type information of the first sound matches sound type information of the second sound;

(b) a difference between the position information of the first terminal and position information of the second terminal is equal to or smaller than a predetermined position threshold; and (e) a detection time difference between the first and second sounds is equal to or smaller than a predetermined time threshold, and a creation configuration configured to, in response to the determination that the first and second sounds are caused by a same event, create a communication group obtained by combining:

(i) respective detection terminals of the first and second terminals; and (ii) respective contact destination terminals identified by identification information contained in respective transmission request messages of the first transmission request message and the second transmission request message.

2. The radio communication system according to claim 1, wherein the relay station further comprises:

a processor coupled to a memory storing instructions for the processor configured to:

transmit an assignment notification including channel information used for communication in the communication group created that is created to each terminal device included in the communication group; and transmit a voice from a terminal that has transmitted one of the first transmission request message or the second transmission request message that has been received by the reception first to another terminal included in the communication group.

3. The radio communication system according to claim 1, wherein the first transmission request message includes positional information of the first terminal, the second transmission request message includes positional information of the second terminal, and the determination determines, when the positional information of the first terminal and the positional information of the second terminal satisfy a specific condition, that the first sound and the second sound are sounds that have occurred due to one event.

4. The radio communication system according to claim 1, wherein the contact destination terminal includes a third terminal and a fourth terminal, the first transmission request message includes identification information of the third terminal which is information regarding the contact destination terminal, the second transmission request message includes identification information of the fourth terminal which is information regarding the contact destination terminal, and the communication group includes the first terminal, the second terminal, the third terminal, and the fourth terminal.

5. A relay station comprising:

a reception configuration configured to receive a first transmission request message and a second transmission request message; and a determination configuration configured to determine whether or not a first sound and a second sound are caused by a same event based on at least one of conditions including:

(a) sound type information of the first sound matches sound type information of the second sound;

(b) a difference between position information of a first terminal and position information of a second terminal is equal to or smaller than a predetermined position threshold; and (e) a detection time difference between the first and second sounds is equal to or smaller than a predetermined time threshold, and a creation configuration configured to, in response to the determination that the first and second sounds are caused by a same event, create a communication group obtained by combining:

(i) respective detection terminals of the first and second terminals; and (ii) respective contact destination terminals identified by identification information contained in respective transmission request messages of the first transmission request message and the second transmission request message.

* * * * *